2,386,433

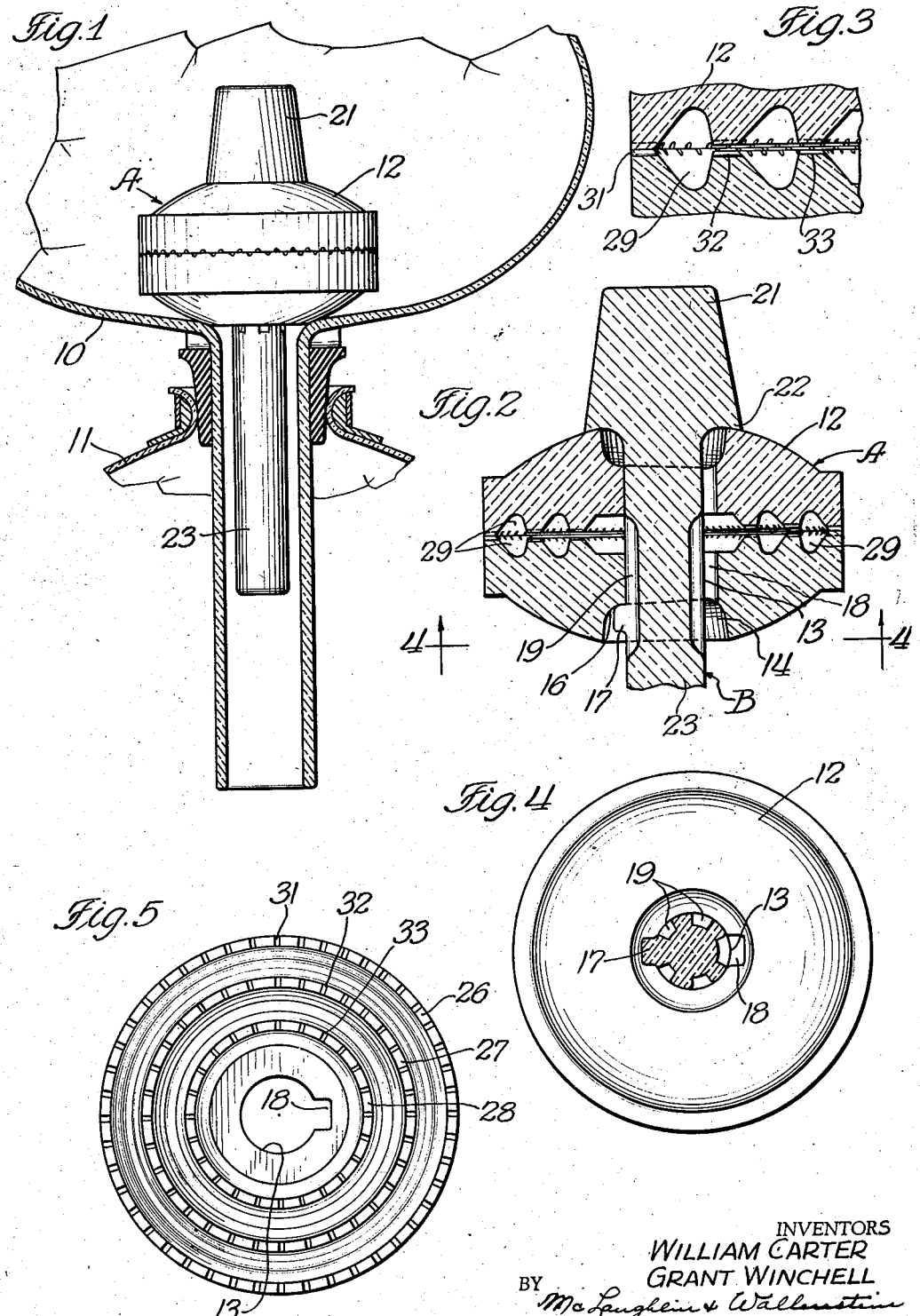
Oct. 9, 1945.    W. CARTER ET AL    2,386,433
FILTER
Filed June 26, 1942
INVENTORS
WILLIAM CARTER
GRANT WINCHELL
BY
ATTORNEYS Patented Oct. 9, 1945

UNITED STATES PATENT OFFICE 2,386,433

FILTER

William Carter and Grant Winchell,
Chicago, Ill.

Application June 26, 1942, Serial No. 448,542

5 Claims. (Cl. 210—162)

Our invention relates to coffee making. It relates more in particular to an improved plural part filter unit adapted for use with so-called vacuum coffee makers.

In coffee making devices of a type employing a lower bowl or decanter and an upper funneled coffee holding container, it is the common practice to employ a strainer comprising a vitreous or ceramic body and a removable strainer element disposed around such body. Strainers of this general type have employed springs and other metal shapes to hold them in position but the use of metal, for several reasons, is objectionable. The cloth comprising the strainer or filter element is objectionable, also, for certain reasons and attempts have been made to produce a satisfactory filter unit which does not employ a cloth. These attempts have been unsuccessful either in that the grounds were not adequately strained from the liquid brewed coffee or the pores of the septum or other filter element used would clog and sometimes even lead to an explosion.

The principal object of our invention is the provision of an improved filter unit for coffee making devices.

A further object is the provision of an improved filter unit which may be employed without the use of springs or other metal parts to hold it in position.

A still further object is the provision of an improved filter unit which does not employ a cloth or other similar strainer unit or septum of a type requiring periodic replacement.

Other objects and features of the invention will be apparent from the following detailed description taken with the accompanying drawing, wherein Fig. 1 is a side elevational view of a filter unit constructed in accordance with our invention, a funneled coffee container and a portion of a decanter being shown in order to illustrate the manner in which the filter unit is supported in position, Fig. 2 is an enlarged vertical sectional view of the filter unit, a portion of the view being broken away to conserve space, Fig. 3 is an enlarged fragmentary portion taken from Fig. 2 showing details of construction of the filter members, Fig. 4 is a plan section taken on the line 4—4 of Fig. 2 looking in the direction of the arrows showing one side of one of the filter members in bottom plan, and Fig. 5 is a top plan view of one of the filter members.

In accordance with the general features of our invention, we provide a plurality of and preferably two relatively flat filter members each with a central aperture adapted to receive a headed stem, the head of the stem serving to seal the uppermost portion of the composite aperture formed by assembling the filter members in face to face relation. The filter members are adapted to receive the liquid brewed coffee at their peripheries, the coffee passing through a tortuous path in the space between the filter members and being delivered to the central aperture and discharged therethrough along the stem and into the lower bowl or decanter. The faces of the filter members adjacent each other are provided with a number of concentric rings in the nature of weirs, the detailed construction of which will be described hereinafter in connection with a preferred embodiment but the function of which is to serve as continuous baffle elements to filter out all of the solid portions of the coffee, even relatively very finely divided particles. The concentric rings in the nature of baffles or weirs furnish successive obstructions to the passing of coffee grounds, pairs of rings on the two filter members being aligned, and one pair preferably being in contact with each other.

Other details and features of the invention will be apparent from the following description of a preferred embodiment wherein two identical filter members are employed, said members being shaped to be assembled with a single stem member to provide a unitary assembly adapted merely to be set into position where it will be supported by its own weight.

Referring now to the drawing, we show a filter unit comprising two identical filter members A and a headed stem B. This unit, when assembled, is adapted to seat into the top or funnel member 10 of a vacuum coffee maker, the upper portion of the decanter 11 of which is shown in the drawing. The members A have surface 12 so shaped that when the unit is set down in the position shown in Fig. 1, a seal will be formed between this surface and the glass of the funnel. This surface, moreover, is so formed that even though the unit may be tilted slightly sidewise (within the limits permitted by the tail of the stem) a seal at the point of contact with the funnel will still be maintained. Each filter member A has a central vertical aperture 12 with an enlarged portion 14 forming a shoulder 16. This shoulder is adapted to be engaged by a lug 17 projecting from the stem B, and the shoulder has a slight pitch as indicated in Fig. 2, so that when the stem B is rotated on its axis with respect to the filter members A, the said filter members will be held tightly together. The central vertical aperture 13 has an offset portion 18 for passing the lug 17 of the stem during assembly. The stem B fits the central apertures 13 which together form a composite aperture or opening running from top to bottom of the assembly comprising the two filter members. The engagement between the stem and filter member is snug but not tight so that there will be very little relative sidewise movement between the filter members A and there will be space for the passage of liquid. In order to definitely provide for ample clearance for coffee liquid, however, and still permit a relatively tight engagement, flutes 19 are provided in the stem as shown clearly in Figs. 2 and 4. To prevent passage of coffee grounds directly into the composite opening comprising the central apertures 13, the head 21 of the stem is shaped to provide an annular sealing shoulder 22 engaging a portion of the surface 12 and thus forming a very effective seal. All of these surfaces, of course, are smooth and not even relatively very finely divided coffee grounds will pass between such surfaces. The stem B has a lower depending portion 23 which assists in assemblying, supporting, transporting and using the unit.

Thus so far it will be seen that we have shown a unit wherein there are two identical filter members assembled with a stem, the stem extending through a continuous vertical aperture provided by the two filter members. The stem carries an annular sealing shoulder to prevent passage of brewed coffee liquid vertically through the central aperture, but the stem is shaped to permit passage of liquid between the stem and the inner wall surface of the vertical stem receiving aperture so that liquid brewed coffee which passes between the filter members from the periphery thereof is readily discharged into the decanter. The filter members are shaped to provide successive obstructions to the passage of coffee grounds while permitting free passage of liquid, and the preferred arrangement shown in the drawing for obtaining this result will now be described.

The two filter members carry a series of oppositely disposed annular concentric weirs of generally truncated cross section with serrated edges as will be described below. Looking at Fig. 5, particularly, these members comprise a positioning weir 26, an intermediate weir 27 and an inner weir 28. Obviously, there may be additional intermediate weirs but we have found three such weirs generally adequate. As indicated in Fig. 2, the positioning weirs 26 of the two filter members engage each other, but there is a slight space between the two intermediate weirs and the two inner weirs of the two filter members. We have found that a total spacing between these weirs of 30/1000 of an inch is satisfactory, although the space may be between approximately 15/1000 of an inch and 1/10 of an inch, depending upon other details of construction. Between successive weirs are annular grooves or recesses 29, the construction and operation being such that coffee grounds which may pass one set of weirs will tend to fall by gravity into an annular groove instead of being lodged against the sealed edge of the next succeeding weir structure.

The serrate formation at the edges of the weirs may be produced in many ways and the details of construction may vary. We have found that in the edge of the positioning weirs 26 a series of half round recesses 31 may be provided of such a size that if two such half round recesses are brought together they will just receive a #52 drill. The recesses, however, may be smaller, if desired, and a larger number used. As shown clearly in Fig. 1, it is not essential that these recesses line up on the two positioning weirs to produce a circular aperture. The number of such recesses 31 may vary but we find a good construction is one wherein the linear space on the weir occupied by the recesses is not substantially less than half of the total linear dimension of the weir. In a construction wherein the filter members have a diameter of 2⅛ inches, we have found that between forty and sixty such recesses 31 may be present, approximately forty-eight being preferred.

What has been said of the serrate formation of the positioning weirs 26, in general, applies with respect to the remaining weirs. We have found that thirty-eight to fifty recesses 32 may be provided on the intermediate weirs with forty to forty-six being preferred; while on the inner weir the recesses 33 may be from approximately twenty-four to approximately thirty-six in number, with good results obtained with about thirty such recesses 33. The recesses in the weirs 27 and 28 are, in general, shallower than the recesses in the positioning weir and the number may be multiplied extensively over the numbers referred to and very good results obtained. Various types of materials may be employed in the production of the filter unit of our invention, ceramic ware such as certain porcelain being suitable, but vitreous materials such as ordinary sodium-aluminum borosilicate glass may also be used as well as certain types of molding compounds and the like.

The filter unit of our invention has definite advantages over filter units of the prior art employed with vacuum coffee makers. The generally plane but regularly irregular surfaces of the relatively flat filter members being shaped to provide a relatively flat continuous opening from the edges of the filter members to the vertical central stem receiving apertures, a tortuous path is provided which is readily traversed by the liquid brewed coffee; but coffee grounds are prevented from passing through to the lower decanter. No metal is required and the construction has the definite advantage that there are no porous openings which can be so charged with debris (oil from the coffee and the like) as to cause a clogging action. The filter members of our invention may, of course, receive some deposit of oleaginous and resinous-like materials from the coffee but this deposit will be more or less uniform on the entire surface of the filter members with which the coffee comes in contact. If there is a considerable deposit, the result will be, further, that the filter members may be held slightly further apart, thus compensating for the deposit in the position which the members then occupy but the unit will nevertheless function in the intended manner. Most important, however, is the fact that the device of our invention may be readily cleaned because it is easily taken apart and all parts of the strainer or filter openings exposed for brushing. If the unit be formed of a ceramic composition, it may be placed directly in a gas flame to burn off any deposit which resists ordinary cleaning and brushing.

While our invention may provide a series of filter apertures between the filter members which require the filter members always being returned to the same relative positions and the top and bottom members may differ in construction, we have found there is an advantage in providing two identical filter members, such as we show in the drawing, which may be assembled in either of two possible positions on the stem and still provide a relatively large number of filter passageways from the peripheral edge to the central aperture.

We have described our invention in detail so that those skilled in the art may understand how to practice the same. The invention, however, is limited only by the scope of the appended claims.

What we claim as new and desire to protect by Letters Patent of the United States is:

1. A filter unit for a vacuum coffee maker comprising two filter members and a stem having a head at one end and a lug spaced from the head, each said filter member having a central aperture to receive the stem with an offset portion to receive said lug, a convexed curved surface adapted to rest against a glass surface, and one surface having a plurality of integral annular concentric weirs with annular grooves between them, a shoulder being provided near said curved surface to engage said lug when the parts are assembled, the parts being so constructed and arranged that when said stem and two filter members are assembled with the said weirs facing each other and the stem extending through said apertures, and the unit placed in position in a top member of a vacuum coffee maker, liquid brewed coffee will be caused to pass between said filter members and across said weirs as it is discharged, said stem being spaced from the filter members sufficiently to permit discharge of liquid downwardly through said central aperture of the lowermost filter member the surfaces of the weirs facing each other being provided with serrations so that the weirs of the two filter members cooperate to produce a coffee straining action.

2. A filter unit for a vacuum coffee maker comprising two filter members and a headed stem, each said filter member having a central aperture to receive the stem, a convexed curved surface adapted to rest against a glass surface, and one surface having a plurality of integral annular concentric weirs with annular grooves between them, the parts being so constructed and arranged that when said stem and two filter members are assembled with the said weirs facing each other and the stem extending through said apertures, a portion of said head becomes seated on a portion of said curved surface, and a pair of weirs, one on each filter member, engage each other, the remaining weirs being slightly spaced from each other, said stem being spaced from the filter members sufficiently to permit discharge of liquid downwardly through said central aperture of the lowermost filter member said mutually engaging weirs having their engaging surfaces serrated to permit passage of liquid therebetween.

3. A filter unit for a vacuum coffee maker comprising two filter members and a headed stem, each said filter member having a central aperture to receive the stem, a convexed curved surface adapted to rest against a glass surface, and one surface having a plurality of integral annular concentric weirs with annular grooves between them, each such weir having a serrated edge, the parts being so constructed and arranged that when said stem and two filter members are assembled with the serrated edges of said weirs facing each other and the stem extending through said apertures, a portion of said head becomes seated on a portion of said curved surface, and a pair of weirs, one on each filter member, engage each other, the remaining weirs being slightly spaced from each other, said stem being spaced from the filter members sufficiently to permit discharge of liquid downwardly through said central aperture of the lowermost filter member.

4. A filter unit for a vacuum coffee maker comprising two filter members and a stem with a head at one end thereof, a lug spaced from the head and a fluted portion therebetween each said filter member having a central aperture to receive the stem with an offset portion to receive said lug, a convexed curved surface adapted to rest against a glass surface, and one surface provided with a plurality of annular concentric serrated weirs with annular grooves between them, a shoulder for engagement by said lug near said curved surface, said shoulder being slightly pitched whereby to permit drawing said filter members together on turning of the stem relative to the filter members, the parts being so constructed and arranged that when said stem and two filter members are assembled with the said weirs facing each other and the stem extending through said apertures, the outermost weirs of the two filter members are in contact, remaining weirs are in alignment but slightly spaced vertically, and said head engages a portion of said curved surface whereby to cause brewed coffee to pass said serrated weirs and be discharged along said fluted portion of the stem.

5. A filter unit for a vacuum coffee maker comprising an upper filter member, a lower filter member and a stem, said filter members being in face to face relation and having aligned annular concentric weirs with annular grooves between them, each such weir having a serrated edge, the outermost weir of each filter member comprising a positioning weir and the two positioning weirs having their serrated edges in mutual contact, the remaining weirs having their serrated edges slightly spaced from each other, the two said filter members having vertical central apertures to receive the stem, with an offset at one side thereof, a head on said stem having a shoulder engaging a smooth surface of the upper filter member to seal the said aperture, a lug on the stem spaced from said head, the portion of the stem between the lug and head being spaced from the filter members to permit passage of liquid, and a shoulder on the lower filter member for engagement by said lug, said shoulder having a pitch whereby to permit drawing the filter members together when said stem is turned relative to the filter members, said lower filter member having a lower surface curved to seal against a smooth surface, liquid brewed coffee during filtering passing between the serrated edges of said weir and through said space between the stem and filter members but said weirs cooperating to prevent passage of solid particles.

WILLIAM CARTER.
GRANT WINCHELL.